(12) United States Patent
Kim

(10) Patent No.: US 7,524,100 B2
(45) Date of Patent: Apr. 28, 2009

(54) LIGHT AND LIQUID CRYSTAL DISPLAY DEVICE HAVING THE SAME

(75) Inventor: Young-Mi Kim, Seoul (KR)

(73) Assignee: LG. Display Co., Ltd., Seoul (KR)

( * ) Notice: Subject to any disclaimer, the term of this patent is extended or adjusted under 35 U.S.C. 154(b) by 0 days.

(21) Appl. No.: 11/477,288

(22) Filed: Jun. 29, 2006

(65) Prior Publication Data

US 2007/0153510 A1   Jul. 5, 2007

(30) Foreign Application Priority Data

Dec. 30, 2005  (KR) ...................... 10-2005-0136183

(51) Int. Cl.
F21S 4/00 (2006.01)
(52) U.S. Cl. .................. 362/611; 362/632; 362/216; 362/390
(58) Field of Classification Search .......... 362/216, 362/217, 220, 222, 223, 632–634
See application file for complete search history.

(56) References Cited

U.S. PATENT DOCUMENTS 6,722,773 B2 * 4/2004 Tsai et al. ................. 362/216
2004/0012971 A1 * 1/2004 Tsai et al. ................. 362/390
2005/0094389 A1 * 5/2005 Peng et al. ................ 362/218
2005/0207148 A1 * 9/2005 Maglica .................... 362/197
2007/0153510 A1 * 7/2007 Kim ......................... 362/225

FOREIGN PATENT DOCUMENTS

CN    1690806 A    11/2005
JP    2004-030990   1/2004

OTHER PUBLICATIONS

First Office Action issued in corresponding Chinese Patent Application No. 2006100903174; issued Mar. 7, 2008.
Office Action issued in corresponding Chinese Patent Application No. 2006100903174; issued Aug. 8, 2008.

* cited by examiner

Primary Examiner—Anabel M Ton
(74) Attorney, Agent, or Firm—Brinks Hofer Gilson & Lione

(57) ABSTRACT

A light for a liquid crystal device comprises a side supporter, a lamp fixing portion installed at a front surface of the side supporter, and a U-shaped lamp insertingly fixed into the lamp fixing portion.

22 Claims, 4 Drawing Sheets

LIGHT AND LIQUID CRYSTAL DISPLAY DEVICE HAVING THE SAME

The present application claims the benefit of Korean Patent Application No. 2005-136183 filed in Korea on Dec. 30, 2005, which is hereby incorporated by reference.

FIELD

The present invention relates to a backlight and liquid crystal display device having the same, and more particularly, to a backlight and a liquid crystal display (LCD) device capable of preventing uneven brightness due to a temperature lowering of a U-shaped lamp.

BACKGROUND

Recently, various portable electric devices, such as mobile phones, personal digital assistant (PDA), and notebook computers have been developed, because of their small size, light weight, and power-efficient operations. Accordingly, flat panel display devices, such as liquid crystal displays (LCDs), plasma display panels (PDPs), field emission displays (FEDs), and vacuum fluorescent displays (VFDs), have been developed. Of these flat panel display devices, the LCDs are currently mass produced because of their simple driving scheme and superior image quality.

The LCD device is a transmissive type display device, and displays a desired image on a screen by controlling an amount of light passing through a liquid crystal layer by a refraction anisotropy of a liquid crystal molecule. Accordingly, the LCD device is provided with a backlight, an optical source passing through a liquid crystal layer for image display. The backlight is generally divided into an edge type backlight that a lamp is installed at a side surface of a liquid crystal panel thus to provide light to a liquid crystal layer, and a direct type backlight that a lamp is installed at a lower portion of a liquid crystal panel thus to directly provide light to a liquid crystal layer.

According to the edge type backlight, a lamp is installed at a side surface of a liquid crystal panel thus to provide light to a liquid crystal layer through a reflector and an optical guide plate. Accordingly, the edge type backlight has a thin thickness thereby to be mainly applied to notebook computers, etc. However, the edge type backlight has the following problems. Since a lamp of the edge type backlight is installed at a side surface of a liquid crystal panel, it is difficult to apply the edge type backlight to a liquid crystal panel of a large area. Also, since light is supplied to the edge type backlight through an optical guide plate, it is difficult to obtain high brightness. Accordingly, the edge type backlight is not proper to be applied to a liquid crystal panel for an LCD television of a large area.

According to the direct type backlight, light emitted from a lamp is directly supplied to a liquid crystal layer. Accordingly, the direct type backlight can be applied to a liquid crystal panel of a large area, and high brightness can be implemented. Therefore, the direct type backlight is mainly used to fabricate a liquid crystal panel for an LCD TV.

FIG. 1 is a view showing a structure of an LCD device having a direct type backlight in accordance with the conventional art.

As shown, the LCD device 1 comprises an LC panel 3, and a backlight 10 installed at a rear surface of the LC panel 3. The LC panel 3 for implementing an image comprises a transparent lower substrate 3a such as glass, an upper substrate 3b, and an LC layer (not shown) formed therebetween. Although not shown, the lower substrate 3a is a thin film transistor (TFT) substrate where a driving device such as a TFT and a pixel electrode are formed, and the upper substrate 3b is a color filter substrate where a color filter layer is formed. A driving circuit unit 5 is provided at a side surface of the lower substrate 3a, and thus applies a signal to the TFT and the pixel electrode formed at the lower substrate 3a, respectively.

The backlight 10 comprises a plurality of lamps 11 for emitting light thereby supplying it to the LC panel 3, a reflector 17 for reflecting light emitted from the lamps 11 thereby enhancing optical efficiency, and an optical sheet 15 for diffusing light emitted from the lamps 11 thereby making it be incident on the LC panel 3.

Typically, a straight-type lamp is used. However, the straight-type lamp has the following problems. As size of the LCD device increases, length of the straight-type lamp and the number of the straight-type lamps have to increase in order to uniformly supply light to the LC panel. Accordingly, fabrication cost for the LCD device is increased.

Recently, a U-shaped lamp is being presented in order to prevent the number of the straight-type lamps from increasing. Since one U-shaped lamp has an electrode at an end portion thereof, it serves as two straight-type lamps. Accordingly, the number of the U-shaped lamps is reduced into a half when compared with the number of the straight-type lamps, and thus fabrication cost is reduced.

FIG. 2 is a view showing a structure of a backlight having a U-shaped lamp in accordance with the conventional art. As shown, the backlight 10 is provided with a plurality of U-shaped lamps 40 on a reflector 17. The U-shaped lamps 40 are supported by supporters 30 installed at both side surfaces of the backlight 10. Although not shown, an optical sheet for enhancing efficiency of light emitted from the U-shaped lamps 40 is arranged on the U-shaped lamps 40.

FIG. 3 is a perspective view showing a part of 'A' in FIG. 2, which shows a state that the U-shaped lamps 40 are fixed by the supporters 30. As shown in FIG. 3, the supporter 30 is provided with a plurality of holes 32. A curved portion of the U-shaped lamp 40 is insertingly fixed into the adjacent holes 32 penetratingly formed in the supporter 30. A first electrode 41 and a second electrode 42 are respectively formed at both ends of the U-shaped lamp 40, and emit light by emitting discharge gas filled in the U-shaped lamp 40. Since one U-shaped lamp 40 serves two straight-type lamps, the number of the U-shaped lamps is reduced and thus power of a backlight that occupies most of regions of an LCD device is reduced.

However, the conventional backlight has the following problems. When the U-shaped lamp 40 is turned on, the curved portion thereof that has been inserted into the supporter 30 is not provided with light. Accordingly, the curved portion of the U-shaped lamp 40 has a lower temperature than a central region of the backlight 10. When the lower temperature is maintained for a long time, discharge gas of Hg injected into the U-shaped lamp is concentrated into the curved portion. Accordingly, entire brightness of the U-shaped lamp 40 becomes uneven.

SUMMARY OF THE INVENTION

A light for a liquid crystal device comprises a supporter, a lamp fixing portion installed at a front surface of the supporter, and a U-shaped lamp insertingly fixed into the lamp fixing portion.

1. In another aspect of the present invention, a backlight for flat panel display device comprises a supporter; a lamp fixing portion formed at the supporter; and a U-shaped lamp fixed into the lamp fixing portion.

In yet another aspect of the present invention, a liquid crystal display (LCD) device, comprises a liquid crystal display panel; a supporter formed below the liquid crystal display panel; a lamp fixing portion formed below the supporter; and a U-shaped lamp fixed into the lamp fixing portion.

In yet another aspect of the present invention, a method for fabricating liquid crystal display (LCD) device, comprises providing a liquid crystal display panel; forming a supporter below the liquid crystal display panel; forming a lamp fixing portion at the supporter; and fixing a U-shaped lamp into the lamp fixing portion.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION

Reference will now be made in detail to the preferred embodiments of the present invention, examples of which are illustrated in the accompanying drawings.

Hereinafter, a backlight according to the present invention will be explained in more detail with reference to the attached drawings.

Figure 1:
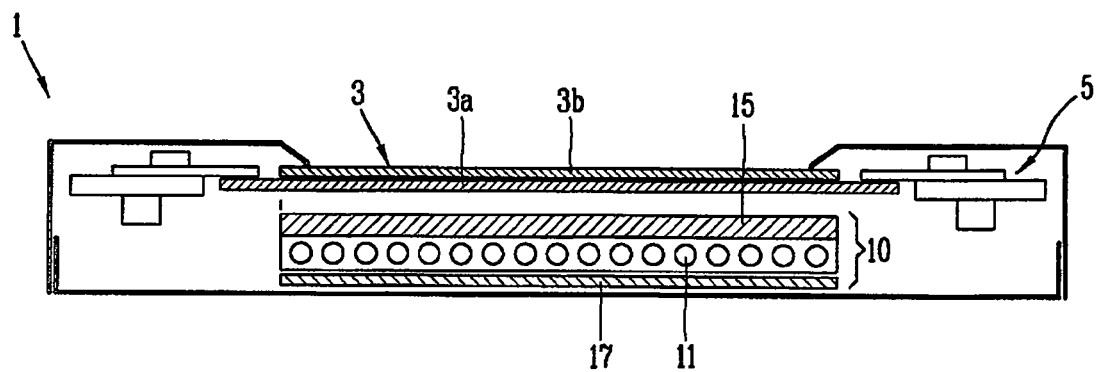
FIG. 1 is a view showing a liquid crystal display (LCD) device having a direct type backlight in accordance with the conventional art.
Figure 2:
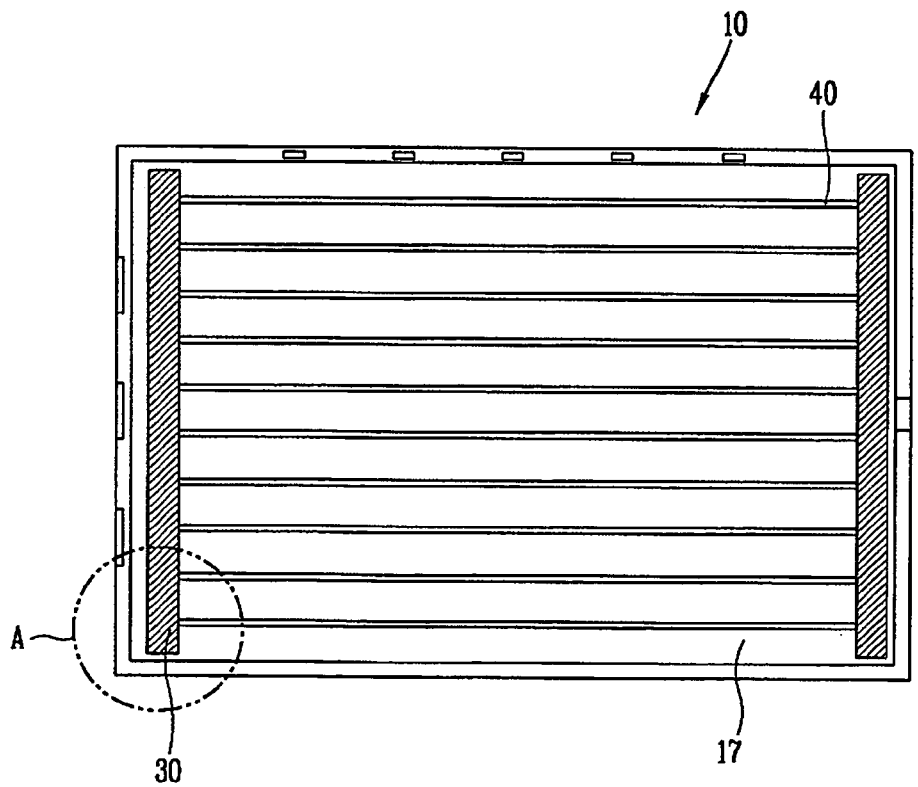
FIG. 2 is a structural view showing a backlight having a U-shaped lamp in accordance with the conventional art.
Figure 3:
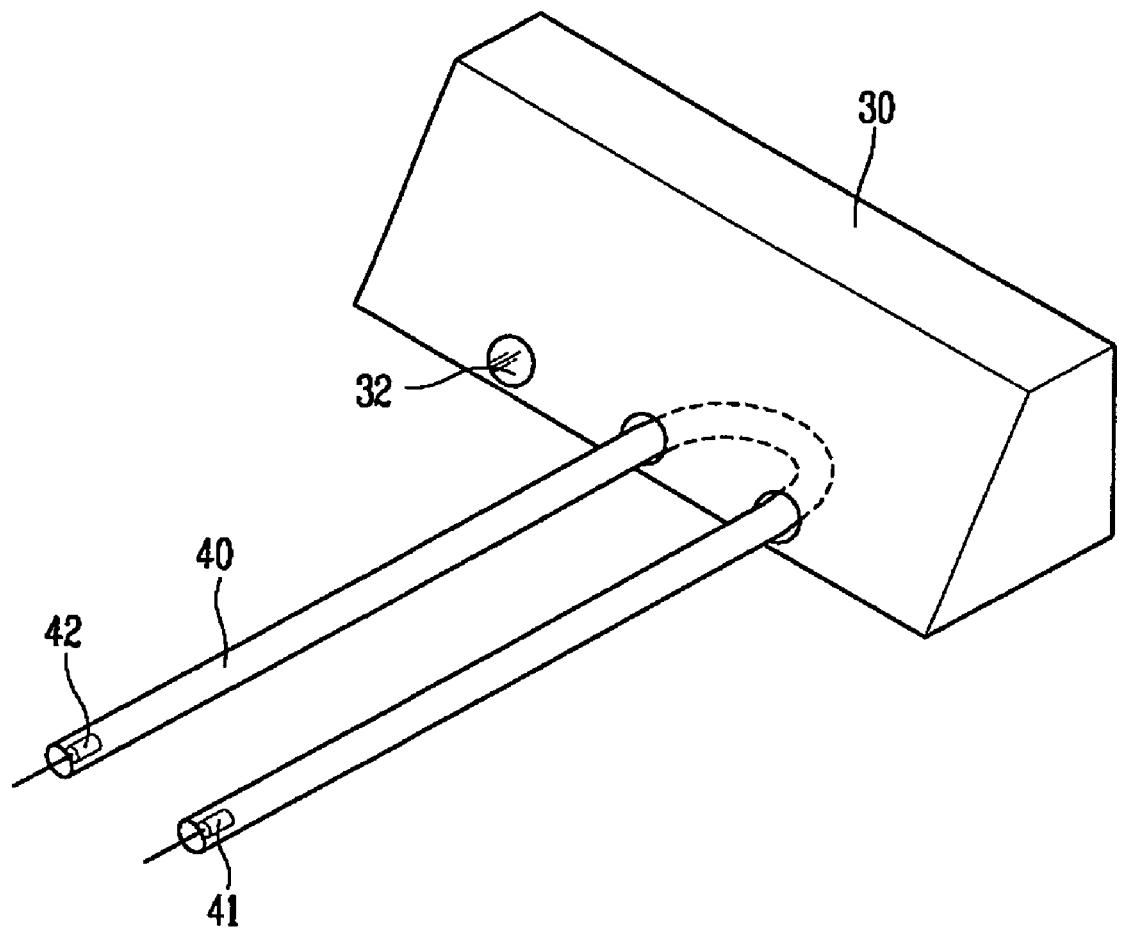
FIG. 3 is a structural view showing the backlight having a U-shaped lamp fixed to a supporter in accordance with the conventional art.
Figure 4A:
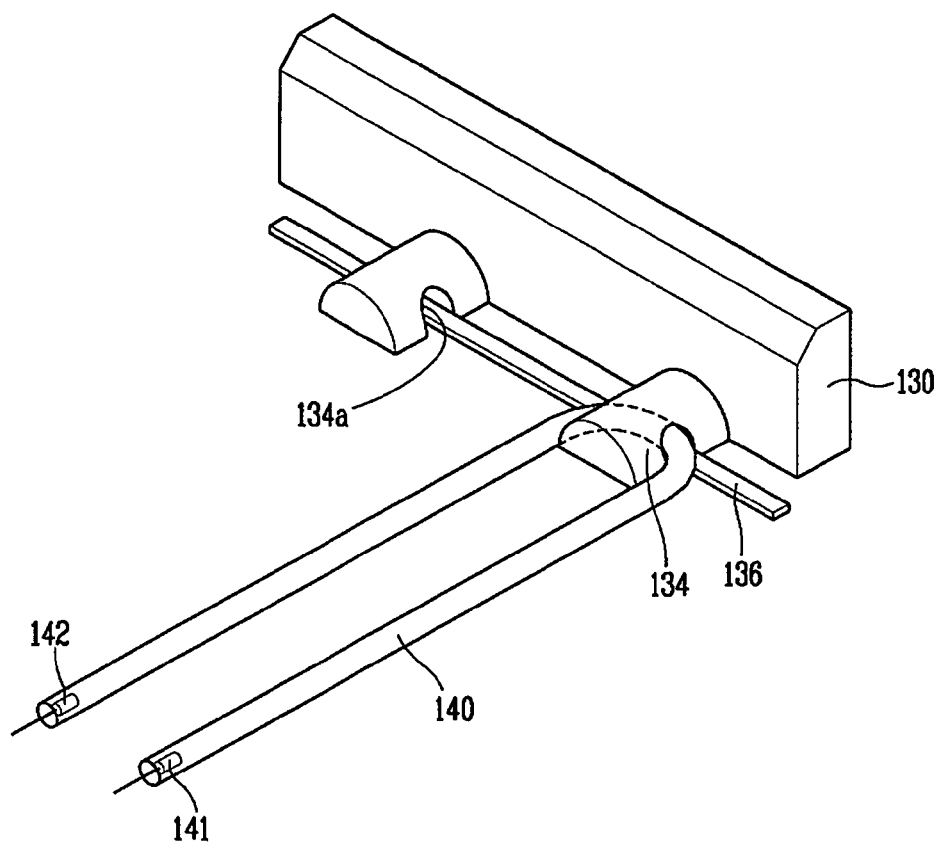
FIG. 4A is a perspective view showing a state that a U-shaped lamp is inserted into a lamp fixing portion of a backlight according to the present invention.
Figure 4B:
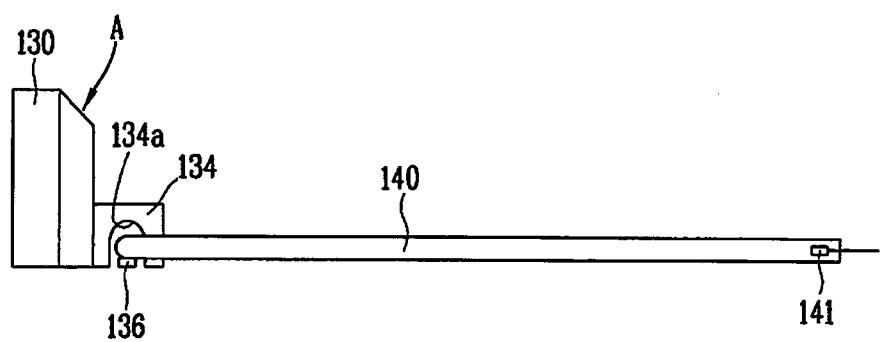
FIG. 4B is a side view showing a state that the U-shaped lamp is inserted into the lamp fixing portion of the backlight according to the present invention.

FIGS. 4A and 4B are views showing a backlight for a liquid crystal display (LCD) device according to the present invention. The backlight according to the present invention has a similar structure as the conventional backlight shown in FIG. 3. Accordingly, only a different structure from the conventional backlight will be explained.

As shown in FIGS. 4A and 4B, a lamp fixing portion 134 is formed at a supporter 130. The lamp fixing portion 134 is formed to have a semi-cylindrical shape, and a through hole 134a is formed at both side surfaces of the lamp fixing portion 134. A curved portion of the U-shaped lamp 40 is inserted and fixed into the through hole 134a. As the U-shaped lamp 140, a cold cathode fluorescence lamp (CCFL) is mainly used. Discharge gas, Hg is filled in the U-shaped lamp 140, and a first electrode 141 and a second electrode 142 are formed at both ends of the U-shaped lamp 140. As a voltage is applied into the U-shaped lamp 140, the discharge gas is discharged thereby to emit light.

A width of the lamp fixing portion 134 varies according to a diameter of the U-shaped lamp 140, and has an approximate width of 4~5 mm. A pad 136 is formed in the through hole, and fixes the U-shaped lamp 140. Although not shown, the U-shaped lamp 140 is fixed by a lamp guide. Accordingly, the U-shaped lamp 140 is installed with a certain gap from a lower surface of the backlight, that is, a reflector 117. As the pad 136 is formed below the U-shaped lamp 140, the U-shaped lamp 140 is stably fixed. Since the curved portion of the U-shaped lamp 140 is arranged to have a certain gap from the lower surface of the backlight, the U-shaped lamp 140 can be damaged by an external force if the pad 136 is not installed.

As the pad is arranged below the curved portion of the U-shaped lamp 140, the U-shaped lamp 140 is prevented from being damaged. The pad 136 formed of a silicon fixes the U-shape lamp 140 and absorbs an impact applied to the U-shaped lamp 140, thereby effectively preventing the U-shaped lamp 140 from being damaged. An only portion of the pad 136 below the U-shaped lamp 140 may be formed of silicon.

The lamp fixing portion 134 is protruded from the supporter 130 with a certain distance. The lamp fixing portion 134 is not formed at a luminescent region, thereby not shielding light incident onto an LC panel. However, the lamp fixing portion 134 is formed at a region adjacent to the image display region, that is, an active region. Accordingly, when the U-shaped lamp 140 is inserted into the through hole formed at both side surfaces of the lamp fixing portion 134 installed outside the supporter 130, a temperature lowering of the curved portion of the U-shaped lamp 140 is scarcely generated when compared to a case that the U-shaped lamp is inserted into the supporter 130. As a result, discharge gas, Hg, is not concentrated onto the curved portion of the U-shaped lamp and thus light with even brightness is emitted.

An upper edge A of the supporter 130 is chamfered with a certain angle of 10~80° in order to obtain even brightness of light emitted from the U-shaped lamp 140, that is, the backlight. An optical path is obtained by the chamfered region, and thus light is prevented from being shielded. Although the chamfered region is formed at one side of the upper edge A, it is formed at both side surfaces of the backlight 10. Accordingly, enhanced and uniform brightness can be obtained by the chamfered region.

Figure 5:
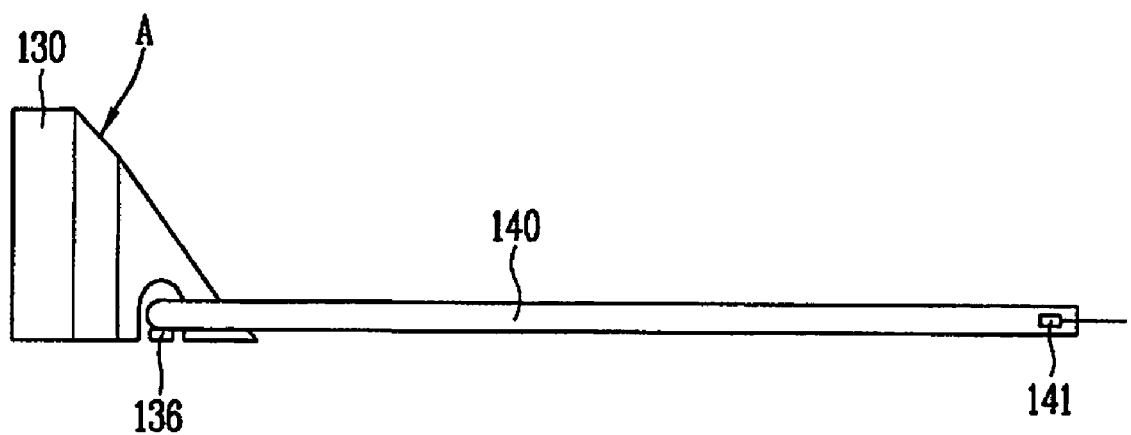
FIG. 5 is a side view showing another shape of the lamp fixing portion of the backlight according to the present invention.

As aforementioned, in the present invention, the lamp fixing portion 134 is installed at a front surface of the supporter 130 thereby to fix the curved portion of the U-shaped lamp 140. Although the lamp fixing portion 136 has a semi-cylindrical shape in the present invention, it can have various shapes. For instance, as shown in FIG. 5, the lamp fixing portion 134 can have a triangular shape or a rectangular shape.

Although not shown, an optical sheet for enhancing efficiency of light emitted from the U-shaped lamp 140 is provided at an upper portion of the U-shaped lamp 140 fixed by the lamp fixing portion 134, thereby guiding light emitted from the U-shaped lamp 140 into the LC panel and displaying an image on the LC panel.

As the LC panel is mounted at the upper portion of the supporter thus to be combined with the backlight, an LCD device is completed.

As aforementioned, in the present invention, the lamp fixing portion for fixing the curved portion of the U-shaped lamp is additionally formed outside the supporter near an image display region, thereby preventing a temperature lowering of the curved portion of the U-shaped lamp. Accordingly, brightness lowering resulting from that Hg is concentrated into the curved portion of the U-shaped lamp is prevented.

Although the embodiments above describe backlight and liquid crystal display device using the same, the present invention is not limited thereto. Other preferred embodiments include frontlight, and liquid crystal display device using the same.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A backlight for flat panel display device having an image display region, comprising:
    a plurality of U-shaped lamps providing the light to the flat panel display device;
    supporters disposed at the both end sides of the U-shaped lamps;
    a plurality of lamp fixing portions at the supporter for fixing the U-shaped lamps, the lamp fixing portions having a through hole; and
    a pad formed below the U-shaped lamps, the pad being formed in the strip shape, the pad being continuously extended along the substantial whole length of one side of the flat panel display device in parallel to the supporters through the holes of a plurality of lamps fixing portions so that a plurality of lamps are contacted with one pad to absorb the impact to the lamps,
    wherein the lamp fixing portions protrude from the supporters so that the U-shaped lamps are disposed at the region adjacent to the image display region.

2. The backlight of claim 1, wherein a width of each of the lamp fixing portion corresponding to a curved portion of the U-shaped lamps has a width of 4 to 5 mm.

3. The backlight of claim 1, further comprising reflector installed below the U-shaped lamp.

4. The backlight of claim 1, wherein a curved portion of the U-shaped lamp is inserted into the through hole.

5. The backlight of claim 1, wherein the pad is formed of silicon.

6. The backlight of claim 1, wherein only portion of the pad in contact with the U-shaped lamp is formed of silicon.

7. The backlight of claim 1, wherein the lamp fixing portions have a semi-cylindrical shape, a triangular shape or a rectangular shape.

8. The backlight of claim 1, wherein an upper edge of each of the supporters positioned at the U-shaped lamp sides is chamfered.

9. The backlight of claim 8, wherein the upper edge of each of the supporters is chamfered with a certain angle of 10 to 80 degrees.

10. The backlight of claim 1, further comprising an optical sheet installed over the U-shaped lamps.

11. The backlight of claim 1, wherein the U-shaped lamps include a cold cathode fluorescence lamp (CCFL).

12. The backlight of claim 1, wherein the supporters are formed at a non-luminescent region, and the lamp fixing portions are at a luminescent region.

13. A liquid crystal display (LCD) device, comprising:
    a liquid crystal display panel having an image display region;
    a plurality of U-shaped lamps providing the light to the liquid crystal display panel;
    supporters below the liquid crystal display panel, the supporters being disposed at the both end sides of the U-shaped lamps;
    a plurality of lamp fixing portions below the supporter for fixing the U-shaped lamps, the lamp fixing portions having a through hole; and
    a pad formed below the U-shaped lamps, the pad being formed in the strip shape, the pad being continuously extended along the substantial whole length of one side of the flat panel display device in parallel to the supporters through the holes of a plurality of lamps fixing portions so that a plurality of lamps are contacted with one pad to absorb the impact to the lamps,
    wherein the lamp fixing portions protrude from the supporters so that the U-shaped lamps are disposed at the region adjacent to the image display region.

14. The LCD device of claim 13, wherein a width of each of the lamp fixing portion has an width of 4 to 5 mm.

15. The LCD device of claim 13, further comprising a reflector installed below the U-shaped lamps.

16. The LCD device of claim 13, wherein the pad is formed of silicon.

17. The LCD device of claim 13, wherein only a portion of the pad in contact with the U-shaped lamps is formed of silicon.

18. The LCD device of claim 13, further comprising an optical sheet installed over the U-shaped lamp.

19. The LCD device of claim 13, wherein the lamp fixing portion has a semi-cylindrical shape, a triangular shape or a rectangular shape.

20. The LCD device of claim 13, wherein an upper edge of the supporter positioned at the U-shaped lamp side is chamfered.

21. The LCD device of claim 20, wherein the upper edge of each of the supporters is chamfered with a certain angle of 10 to 80 degree.

22. The LCD device of claim 13, wherein each of the U-shaped lamp includes a cold cathode fluorescence lamp (CCFL).

* * * * *

UNITED STATES PATENT AND TRADEMARK OFFICE
CERTIFICATE OF CORRECTION

PATENT NO.         : 7,524,100 B2
APPLICATION NO.    : 11/477288
DATED              : April 28, 2009
INVENTOR(S)        : Young-Mi Kim Page 1 of 1

It is certified that error appears in the above-identified patent and that said Letters Patent is hereby corrected as shown below:

In column 5, claim 3, line 42, after "further comprising" delete "reflector" and substitute --reflectors-- in its place.

In column 6, claim 12, line 10, after "portions are" insert --formed--.

In column 6, claim 19, line 44, before "a semi-cylindrical shape" delete "has" and substitute --have-- in its place.

In column 6, claim 20, line 47, before "positioned at the U-shaped" delete "the supporter" and substitute --each of the supporters-- in its place.

In column 6, claim 22, line 53, before "includes a cold cathode" delete "lamp" and substitute --lamps-- in its place.

Signed and Sealed this

Twenty-fifth Day of August, 2009

David J. Kappos
*Director of the United States Patent and Trademark Office*